July 19, 1966  C. L. WILSON  3,261,298
MAGNETIC PUMP COUPLING
Filed Nov. 13, 1964
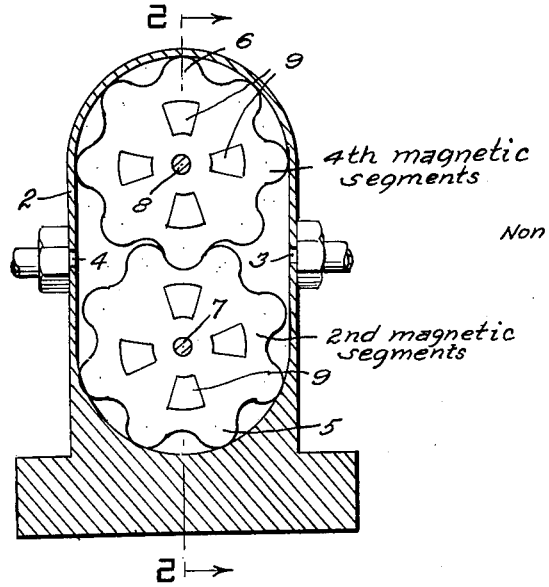
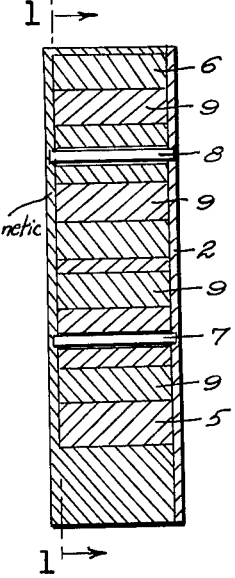
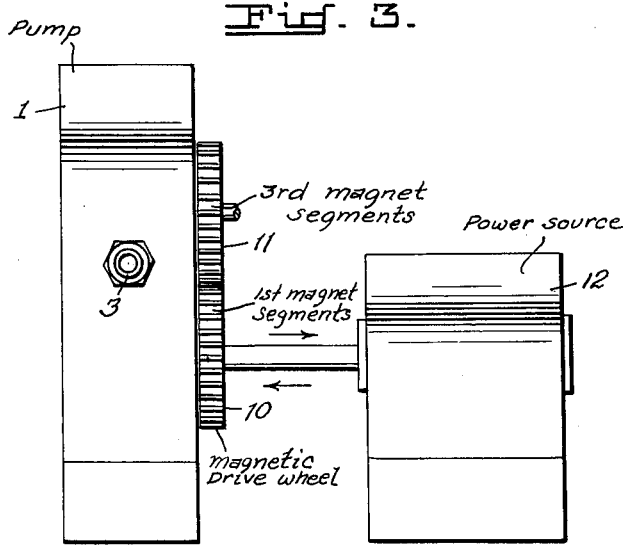
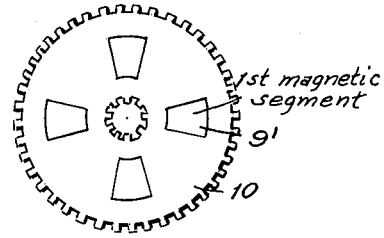
INVENTOR.
Curtis L. Wilson
BY: Harry M. Saragovitz,
Edward J. Kelly, and
Herbert Berl

3,261,298
MAGNETIC PUMP COUPLING
Curtis L. Wilson, Box 1094, Sierra Vista, Ariz.
Filed Nov. 13, 1964, Ser. No. 411,165
3 Claims. (Cl. 103—118)

The invention described herein may be manufactured and used by or for the Government for governmental purposes without the payment to me of any royalty thereon.

The present invention relates to apparatus to transmit power from an external source to the interior mechanism of a pump without any mechanical or physical connection.

In the drawing:

FIG. 1 is a sectional view of the interior of a gear type pump, along 1—1 of FIG. 2, including magnetic segments of the pump drive;

FIG. 2 is a cross section along line 2—2 of FIG. 1;

FIG. 3 is a diagrammatic representation of a pump, power source, and the magnetic pump drive coupling of the present invention; and FIG. 4 is a detail of the drive wheel which delivers power to the pump.

Pump 1 has a completely closed body 2 with no opening of any kind except for the conventional inlet and outlet ports 3 and 4. The drive shaft does not project through the wall as it does in conventional pumps.

Gears 5 and 6, mounted on shafts 7 and 8, propel a gas or liquid through the pump in the conventional manner.

Gears 5 and 6 are made of a substantially nonmagnetizable material and have one or more magnetic segments 9 in at least one of the gears.

The body 2 of the pump is preferably made of substantially nonmagnetic material. Alternatively, the portion of the wall through which magnetic force enters from the magnetic drive wheel 10 is made of substantially nonmagnetic material.

Magnetic drive wheel 10 has magnetic segments 9' similar to segments 9 in gears 5, 6. Drive wheel 10 may drive a second drive wheel 11, if desired, which also has magnetic segments 9'. Drive wheels 10, 11 are preferably locked in synchronism with one another. For this purpose the drive wheels may be gears, for example. Of course the gears 5, 6 are similarly locked in synchronism.

For convenience of description the magnetic segments of drive wheels 10, 11 may be designated as first and third magnetic segments 9' respectively while the magnetic segments of gears 5 and 6 may be designated as second and fourth magnetic segments 9. By positioning drive wheels 10, 11 just outside of pump housing 2, and in line with gears 5, 6, magnetic forces from the first and second magnetic segments, and from the third and fourth magnetic segments, will cause the drive wheels and gears to move in synchronism as though locked together. Thus, rotation of drive wheel 10 by power source 12 will also rotate gears 5, 6.

If desired, drive wheels 10, 11 may be mounted movably toward or away from the pump (and gears 5, 6) to thereby vary the magnetic forces transmitted between 10, 11 and 5, 6. This feature may be used to advantage as a safety clutch where the "clutch" magnetic coupling may be disengaged, or reduced in torque transmitting ability, for different pumping requirements.

Although the invention is illustrated as driving two gears of a gear pump it is to be understood that almost any type of rotary pump could be driven by the type of magnetic pump coupling disclosed. There is no shaft to require a seal around and no chance for poisonous, corrosive or hard-to-handle gases or liquids to escape.

I claim:
1. Apparatus for transmitting power from a power source to the interior of a fluid-moving pump casing without a mechanical or physical connection comprising; a pump casing, a portion of which is substantially non-magnetic and through which magnetic forces may pass, a plurality of pumping members inside of said casing, magnetic members fixedly secured to said pumping members and rotatable therewith, a plurality of magnetic drive members outside of said casing, said drive members being mounted for rotation in axial alignment and in close proximity with said magnetic members inside of said casing, and means synchronizing rotation of said drive members.
2. Apparatus as set forth in claim 1 wherein the entire pump casing is made of substantially nonmagnetic material.
3. Apparatus as in claim 1 wherein said pumping members are non-magnetic and magnetic members are imbedded in said plurality of pumping members.

References Cited by the Examiner
UNITED STATES PATENTS
| | | | |
|---|---|---|---|
| 2,481,172 | 9/1949 | Staggs | 103—1 |
| 2,511,660 | 6/1950 | Wilson | 103—126 |
| 2,941,477 | 6/1960 | Dalton | 103—87 |

FOREIGN PATENTS
| | | |
|---|---|---|
| 757,062 | 9/1956 | Great Britain. |
| 130,674 | 1/1951 | Sweden. |

MARK NEWMAN, *Primary Examiner.*

R. M. VARGO, *Assistant Examiner.*